J. F. APPLEBY
Harvester-Rake.
No. 162,002
Patented April 13, 1875.
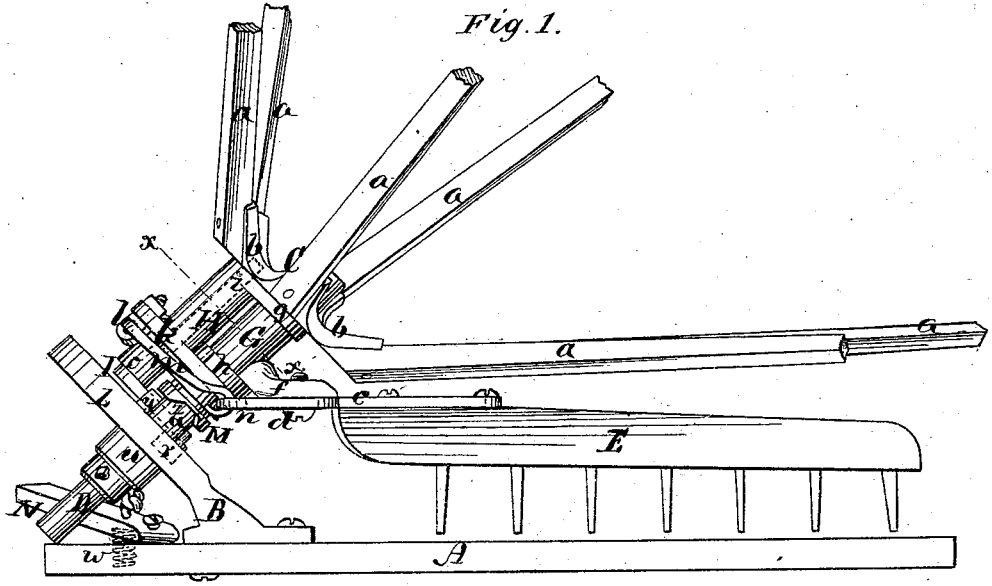
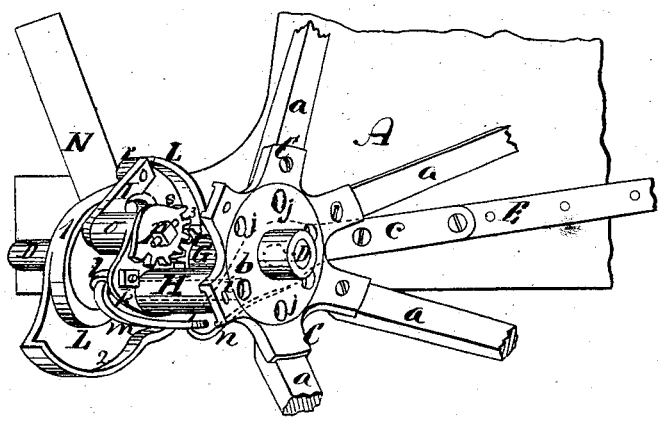
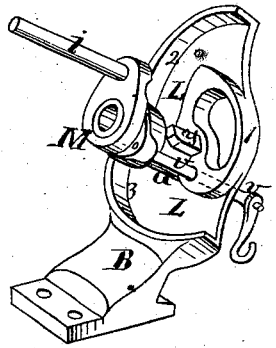
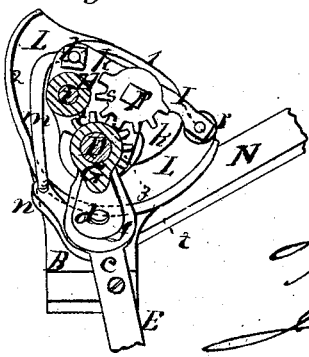
Witnesses
R. D. Smith
F. B. Townsend
Inventor
John F. Appleby,
By his atty,
J. S. Brown.

UNITED STATES PATENT OFFICE.

JOHN F. APPLEBY, OF MAZOMANIE, WISCONSIN, ASSIGNOR OF ONE-HALF HIS RIGHT TO E. D. BISHOP, OF SAME PLACE.

IMPROVEMENT IN HARVESTER-RAKES.

Specification forming part of Letters Patent No. 162,002, dated April 13, 1875; application filed September 4, 1874.

*To all whom it may concern:*

Be it known that I, JOHN F. APPLEBY, of Mazomanie, in the county of Dane and State of Wisconsin, have invented an Improvement in Harvester-Rakes; and I do hereby declare that the following is a full and exact description thereof, reference being had to the accompanying drawings, making part of this specification.

Figure 1 is a front elevation of my improved rake and devices for operating the same, shown in connection with a harvester-reel, reel standard or support, and platform; Fig. 2, a top view of the same; Fig. 3, a view of the reel standard or support, in perspective, showing also a part of my rake-operating device in position thereon; Fig. 4, a section taken in a plane indicated by the line $x\ x$, Fig. 1.

Like letters designate corresponding parts in all of the figures.

In the drawings, A represents a harvester-platform with a side delivery; B, the reel standard or support thereon; C, the reel; D, the reel-shaft; and E, the rake, turning around the reel-shaft as a pivot.

My improvement in the rake includes its operative mechanism, and also its arrangement and that of the reel and shaft in relation to one another, as co-operating to effect the complete result.

The reel C turns upon an inclined shaft, D, the vertical plane of its axis being parallel, or nearly so, with the cutter-bar, and the angle of its inclination being forty-five degrees, or thereabout. Its standard or support B is a casting, firmly secured to the platform or finger-bar of the harvester, and provided with a single socket-bearing, in which the reel-shaft D turns. The reel-arms $a\ a$ are situated at an angle of forty-five degrees, or thereabout, from its shaft D, so that as they pass over the front part of the platform A they are in a horizontal, or nearly horizontal, position, and as they return forward in the opposite direction they assume a vertical, or nearly vertical, position. The reel-arms are bolted to a flanged casting or hub, $b$, secured to the upper end of the reel-driving shaft.

In connection with the above-described construction and arrangement of the reel C the rake E has a position just outside of the arms thereof, so that when it reaches a position over the front part of the platform it is immediately under one of the reel-arms. The mounted end of the rake, terminating, as shown in the drawings, with a flange-iron, $e$, is pivoted at $d$ to an arm, $f$, projecting from a sleeve, G, which is mounted and turns on the reel-shaft below the reel-hub $b$. The face of the rake-holding arm $f$ is at an angle of forty-five degrees, or thereabout, from the axis of the reel-shaft D and sleeve G, so that when the rake is radially parallel with the reel-arms $a\ a$ it is also tangentially parallel, or nearly so, therewith. This is the relative position of the parts when the rake is over the front part of the platform A, as shown in Figs. 1 and 2. From this position the proper movement of the rake through about one-quarter of a circle to the side delivering edge of the platform, is in a horizontal, or nearly horizontal, plane, close over the platform, and at a speed considerably slower than the motion of the reel-arms.

The direction of the rake's motion in a horizontal plane in my improved rake-operating device is produced by stopping, for the time, the motion of the rake-bearing sleeve G and its arm $f$ around the reel-shaft, while the rake itself continues to move round by turning on the pivot $d$, the plane of the bearing-arm $f$ in that position being nearly, or exactly, horizontal. The retarded motion of the rake over the platform at the same time is effected by the following mechanism:

Upon the reel-shaft D is mounted a piece, H, which, for convenience of description, I will term a "regulator." It has two bearings, $g$ and $h$, which turn around the reel-shaft, the former close under the reel, above the rake-sleeve G, and the latter just below the rake-sleeve. Its body, which is situated parallel with the reel-shaft, has a longitudinal hole through it, in which is located a coupling-pin, $i$, projecting upward beyond the regulator, and entering one of a set of holes, $j\ j$, (as many as there are reel-arms $a\ a$,) in the reel-hub $b$, whereby the regulator is coupled to the reel, and through which the rake is caused to turn around the reel-shaft. The regulator has a lateral projection, $k$, in one part of which is pivoted a swivel-bolt, l, connected by a rod or bar, m, with a heel projection, n, of the rake, or its flange c, as shown, the said connecting-rod m having a free joint at each end with the respective parts which it connects. On another part of the projection k of the regulator is a bearing, o, the axis of which is parallel with the reel-shaft, and in which turns or oscillates the shaft p of a crank-arm, I, provided with a friction-roller, r, at its outer end. On the upper end, also, of the crank-shaft p is secured a portion or sector of a cog-wheel, s, which gears into another cogged sector, t, on the sleeve G. The crank-roller r travels upon the surfaces 1, 2, and 3 of a stationary cam, L, cast with or secured upon the reel standard or support B, substantially as shown in the drawings. This regulator, with its crank and cogged sector, together with the cam L and the cogged sector on the sleeve G, controls the speed of the rake, acting through the connecting-rod m, the manner of the control being thus: When the rake reaches the front edge of the platform the crank heel or roller r just reaches the lower end of the face 1 of the cam L. This cam-face diverges thence from the center of revolution—that is, the axis of the reel-shaft D—so that the crank I is swung outward in passing over said cam-face, thereby causing the cogged sector s on the crank-shaft to travel forward over the cogged sector t of the sleeve G, the latter acting as a stationary rack, since the eccentricity of the cam-face 1 is just sufficient to allow the said sector s to travel forward without moving the sector t at all; consequently the sleeve G, with its bearing f, remains stationary, as desired, while the rake is traveling over the platform. During the same time, while the rake-flange c remains in a longitudinal plane, the regulator projection k, with its swivel-bolt l, is moving in a different (oblique) plane, its inclination to a horizontal plane being sufficient to cause the connecting-rod m, driven by the said regulator projection, to swing somewhat, and thus not move the rake so fast as the reel-arms travel, the retardation of the rake being determined by the proportions and arrangement of the said parts cooperating to produce it. Then, since the retardation of the rake during this part of the reel's revolution requires the rake to turn even faster than the reel in another part of the latter's revolution, because the reel and rake make an entire revolution in the same time, the second face 2 of the cam converges toward the center of revolution, so that the crank-roller r is caused thereby to turn backward on its axis, while its shaft continues to travel forward around the reel shaft, the effect of which is to cause the sector s to act upon the sector t as a cog-wheel, and to revolve the sleeve G, and consequently the rake, around the reel-shaft faster than its own and the reel's revolving motion. This movement is during the forward upward motion of the rake. During the remainder of the revolution the crank-roller r travels along the concentric part 3 of the cam L, and the rake and reel move simultaneously, the rake always coming directly under a reel-arm or beater when it reaches the front edge of the platform.

One of the advantages of this arrangement of the rake in relation to the reel is, that the rake always acts in unison with the reel-arms on the standing grain, and in traveling backward over the platform a reel-arm always precedes the rake just enough to lay the cut grain backward upon the platform and make an even gavel.

Another feature of my invention consists in an improvement in the method of stopping the rake in a position best suited for starting it again, when it is desired to intermit the action of the rake in cutting thin and light grain. The coupling-pin i passes through regulator H, and is attached, at its lower end, to a collar, M, as shown most clearly in Fig. 3, which is situated and has an axial reciprocating sliding movement on the upper end of the socket-bearing u of the reel standard or support B. This collar is moved down to withdraw the coupling-pin from the coupling-holes in the reel-hub, for uncoupling the rake mechanism from the reel by its own gravity, and that of the coupling-pin i. But it is held up during that part of the revolution of the reel in which the rake is required to revolve therewith by a stud or projection, y, on one side of the bearing u, just below the lower edge of the collar, which prevents the descent of the same until a notch, z, in the lower edge of the collar comes round over the said stud, and allows the collar to slide down on the bearing, for automatically uncoupling the rake from the reel. This notch is so arranged in relation to the position of the stud y that the collar is always let down just when rake has arrived at its forwardmost position, ready to descend quickly to the front edge of the platform, so that when it is allowed to start again it will help to couple itself to the reel by its own gravity, and almost instantly reach the platform and begin to rake off the gavel. Thus no calculation as to when the gavel will be ready for raking off is required of the driver. As soon as the collar M is allowed to slide upward the coupling-pin enters the first coupling-hole in the reel-hub that reaches it, the said holes being all so arranged that the rake will come directly under one of the reel-arms. The ends of the collar-notch z are made inclined or rounded, as shown, so that the collar will ride easily on the stud y, and act as a cam thereon, to lift itself and couple the rake to the reel. The stud usually has a friction-roller (not shown) at its upper edge to lessen the friction of the contact with the collar. When it is desired to hold the rake uncoupled from the reel, as in cutting thin grain, to rake the gavels less frequently, a treadle-lever, N, or its equivalent, is employed, being connected with the collar M by a rod, v, the said rod having at its upper end a fork, which fits in a peripheral groove of the collar. By pressing down on the lever the collar M is held down, when its notch $z$ is over the stop $y$, until it is desired to allow the rake again to come into operation.

What I claim as my invention, and desire to secure by Letters Patent, is—

1. In combination with the reel C, reel shaft D, and rake E, arranged to have the inclinations in relation to one another and to the platform substantially as herein set forth, the rake-carrying sleeve G, constructed as described, and arranged to have its revolving motion intermitted when its rake-bearing is directly under the reel-shaft, and there to hold the rake-pivot in a vertical position while the rake travels over the platform, substantially as and for the purpose herein specified.

2. The combination of the rake-sleeve G, regulator H, crank-arm I, geared to the sleeve G, and stationary cam L, constructed and arranged, in relation to one another and to the rake E, substantially as and for the purpose herein specified.

3. The combination of the reel-hub $b$, provided with coupling-holes $jj$, the coupling-pin $i$, regulator H, connecting-rod $m$, and rake-heel $n$, substantially as and for the purpose herein specified.

4. The combination of the reel-hub $b$, having coupling-holes $jj$ therein, the sliding coupling-pin $i$, supported in the regulator H, sleeve M, having a notch, $z$, with inclined or rounded terminations, the fixed stop $y$, and sleeve-holding lever N, substantially as and for the purpose herein specified.

JOHN F. APPLEBY.

Witnesses:
J. S. BROWN,
J. TYLER POWELL.